United States Patent [19]
de Lavalette

[11] 3,729,076
[45] Apr. 24, 1973

[54] OVERRUNNING CLUTCH

[75] Inventor: Pierre De Lacroix de Lavalette, Paris, France

[73] Assignee: Societe Anonyme dite: SKF Compagnie D'Applications Mecaniques, Clamont, France

[22] Filed: June 3, 1971

[21] Appl. No.: 149,722

[30] Foreign Application Priority Data
June 4, 1970 France..........................7020610

[52] U.S. Cl..............................192/41 A, 192/45.1
[51] Int. Cl..............................................F16d 41/07
[58] Field of Search..........................192/41 A, 45.1; 188/82.8

[56] References Cited

UNITED STATES PATENTS

| | | | |
|---|---|---|---|
| 2,428,962 | 10/1947 | Davis | 192/45.1 |
| 2,385,799 | 10/1945 | Dodge | 192/45.1 |
| 2,753,027 | 7/1956 | Troenoly et al. | 192/45.1 |
| 2,630,896 | 3/1953 | Dodge | 192/45.1 |
| 3,219,163 | 11/1965 | Zlotek | 192/45.1 |
| 3,651,908 | 3/1972 | Oldfield | 192/41 A |

Primary Examiner—Allan D. Herrmann
Attorney—Holcombe, Wetherill & Brisebois

[57] ABSTRACT

Overrunning clutch of the type comprising a plurality of cams positioned between the two facing concentric surfaces of a shaft and concentric external ring, said clutch comprising an annular cage having openings through which said cams project, said cams being smaller at one end than the other and said openings being large enough to pass the smaller end of a cam but too small to pass the larger end, and spring means engaging the smaller end of each cam and biassing it away from said cage toward one of said concentric surfaces.

7 Claims, 3 Drawing Figures

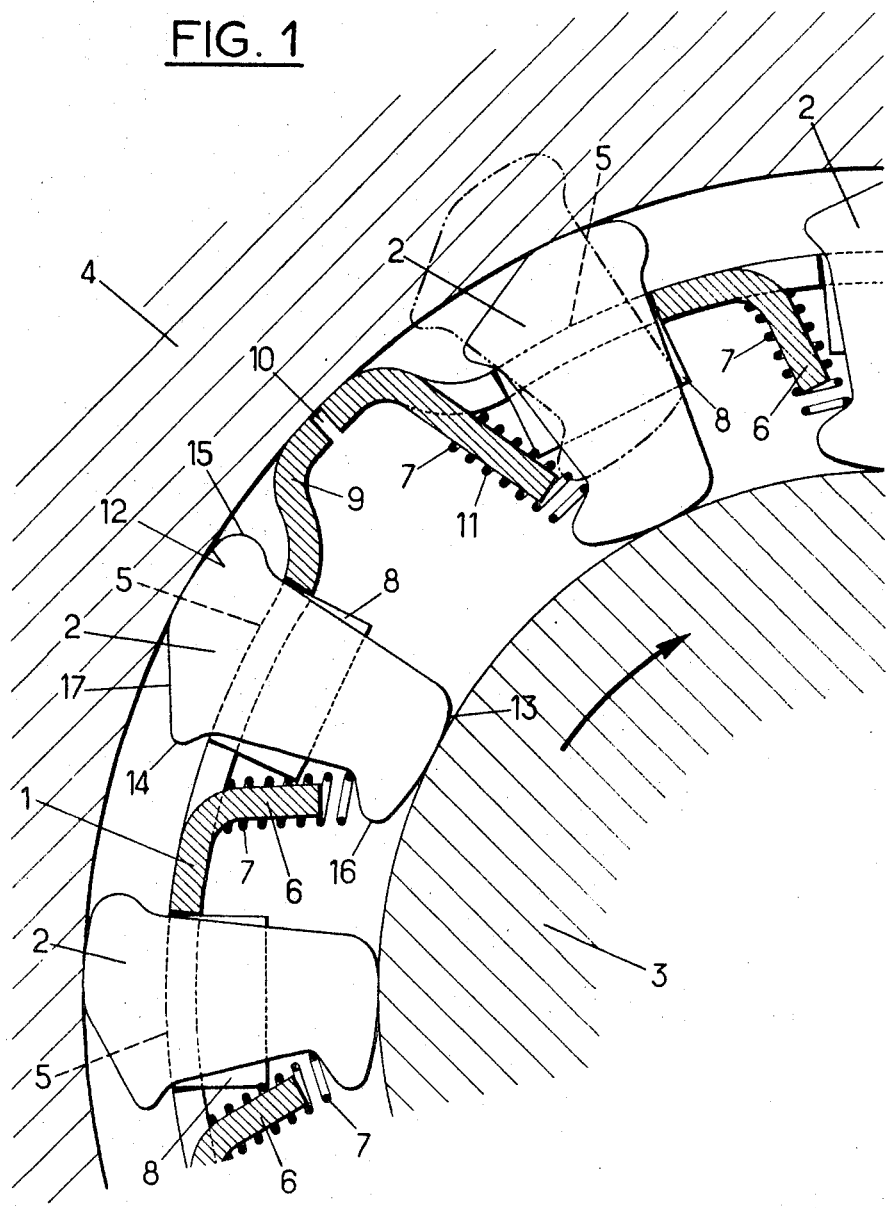

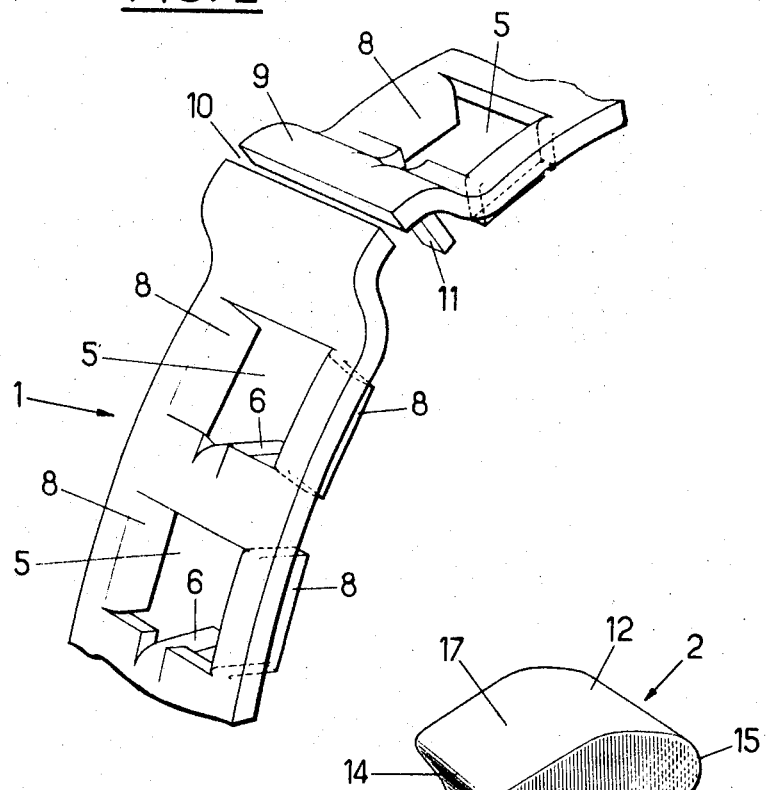
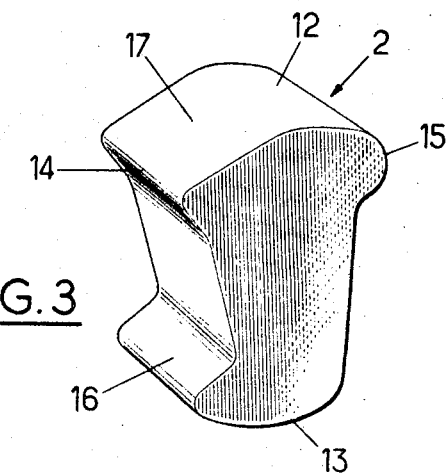

OVERRUNNING CLUTCH

SUMMARY OF THE INVENTION

This invention relates to overrunning clutches for the cam actuated type adapted to enable a cylindrical member to be driven by a shaft in one direction only.

Known devices of this type comprise roller bearings which are adapted to be gripped between two non-concentric raises. In this case balls are used which are pressed against the outer race by means of springs bearing on flanges formed in the inner rotating shaft.

In another known device, cams are used which have a particular shape and are adapted to be squeezed between the cylindrical inner surface of an outer ring and a concentric shaft. In order to facilitate the mounting of these cams it is necessary that the cams be held in position by two cages. These cages comprise windows adapted to fit the cams, with the outer cage comprising also, means for attaching it to the outer ring. A single spring between the cages bearing on the cams serves to provide the overrunning clutch effect.

These latter devices require delicate work to mount them and do not permit the assembly comprising the cages, the springs and the cams to be easily removed, since they are held in position only by contact with the inner surface of the ring and the concentric shaft.

In other known arrangements, this disadvantage is avoided by providing grooves formed in the cams and cooperating with a particularly shaped edge of the cage so that, when spring biassed, the cams are held in the cage.

Such an arrangement has, however, the disadvantage of complicating the mounting of the cams and requiring a machining thereof which substantially increases the cost of production of the clutch.

The device according to the invention makes it possible to avoid these disadvantages. In this device it is possible to withdraw the assembly comprising the cages, spring and cams, without releasing the cams. Storage and transportation are thus facilitated because these operations may take place independently for the assembly comprising the cages, spring and cams and the assembly comprising the other mechanical parts, especially the shaft and the outer ring.

The device according to the invention also makes it possible to provide an overrunning clutch which is simpler and less troublesome than those heretofore known.

The device according to the invention comprises in combination cams of a particular shape cooperating with a single cage. The cage is provided with windows having dimensions such that they permit only a partial introduction of the cams from the outer side toward the inside.

In a preferred embodiment of the device according to the invention the cams are held in contact with the races by means of a single spring of a conventional form bearing on each cam and comprising, like the cage, windows permitting the partial passage of the cams.

In another embodiment the cage comprises in a conventional manner, in alignment with each window, a substantially radial inwardly directed pin and a member acting as a spring attached to said pin and bearing on a corresponding boss on the cam.

Each of the cams according to the invention comprises two substantially cylindrical bearing surfaces in contact with the bore of the outer ring and the shaft. The outer part of these cams is larger than the windows of the cage whereas the inner part is smaller dimensions than said windows. The inner part is, on the other hand, provided on one side with a boss cooperating with said spring.

It will be seen that, as a consequence of the arrangement according to the invention, the cams may be introduced from the outside toward the inside through the windows of the cage and then held in this position by springs which bear on each of the cams. The dimensions of the outer part of the cams do not permit these to escape through the windows in response to the pressure of the spring and the assembly comprising the cages, spring and cams is held perfectly together independently of the presence of the outer ring on the shaft.

This result is also obtained without requiring complex machining of the cams as in certain known devices.

The cams according to the invention may be produced by simple cutting of a shaped bar.

In one embodiment of the device according to the invention the means for engaging the cage within the outer ring consists of at least two outwardly projecting bosses to resiliently hold the cage in the bore of the outer ring.

These bosses moreover, serve to center the assembly comprising the cages, spring, and cams with respect to the shaft and the outer ring.

In another embodiment of the device according to the invention one of the bosses comprises a slot parallel to the axis of the cage and extending the entire width of the cage. This slot makes it possible to provide for easier mounting of the cage in the bore of the outer ring by utilizing its elasticity.

In a preferred embodiment of the device according to the invention the windows of the cage comprise two flanges bent back toward the inside and perpendicular to the axis of the cage. The cams which are in contact with these flanges are thus better positioned perpendicularly to the shaft.

The operation of the device according to the invention will be better understood from a study of the following embodiment illustrated in the accompanying drawings and given purely by way of example. On these drawings:

FIG. 1 is a partial sectional view of one embodiment of the invention taken in a plane perpendicular to the axis of the cage;

FIG. 2 is a partial perspective view of an embodiment of a cage according to the present invention; and FIG. 3 is a perspective view of a cam according to the invention.

As shown on the drawings, the overrunning clutch according to the invention comprises a cage 1 and cams 2 in contact with a shaft 3 and the inner surface of an outer ring 4.

The cage 1, which may be made for example of stamped sheet material, comprises windows 5 and, at one edge of each window, a substantially radial projection 6 on which is coiled a spring 7. The two lateral edges of the windows have been bent back to form flanges 8 which are inwardly directed and perpendicular to the axis of the cage. The cage is fastened to the outer ring by at least two bosses 9 which are outwardly directed and elastically hold and center the cage 1 with respect to the axis of the shaft 3.

The boss 9 shown on FIG. 1 comprises a slot 10 extending the full width of the cage, which permits it to be mounted in the bore of the outer ring. It will be noted on FIG. 1 that the pin 11 immediately adjacent the boss 9 is slightly longer than the pins 6.

It will be seen from FIGS. 1 and 3 that the cams 2 conforming to the present invention have two substantially cylindrical surfaces 12 and 13, in contact with the inner surface of the outer ring 4 and the external surface of the shaft 3, and a surface 17 spaced from the inner surface of the outer ring 4. The outer part of the cam 2 comprises bosses 14 and 15 so that the cam at this point is wider than the windows 5. The cams 2 may be simply manufactured by cutting a shaped bar having a contour corresponding to the shape of the cams.

FIG. 1 shows in broken lines the cam 2 during its mounting in the cage 1 and that the cams 2 may be easily introduced through the windows 5. This introduction is only part way, however, since the bosses 14 and 15 prevent the passage of the upper part of the cam 2 through the windows 5. In the example illustrated in FIG. 1 the cams 2 are equidistant but this arrangement is not necessary. It will be seen on FIG. 1 that the cams 2 are held in position in the windows 5 of the cage 1 by the flanges 8 and the spring 7 which rests on the boss 16. When the shaft 3 turns in the direction indicated by the arrow on FIG. 1 the surfaces 13 of the cams 2 are pressed against the outer surface of the shaft 3 by the spring 7 bearing on the bosses 16. The cams are thus gripped between the shaft 3 and the inner surface of the outer ring 4 so as to insure that the outer ring 4 is driven in the same direction as the shaft 3 by frictional engagement with the surfaces 12 and 13 of the cams 2 with the shaft 3 and the outer ring 4.

When the shaft 3 turns in the opposite direction the cam 2 compresses the spring 7 by means of the boss 16. The surface 17 of the cam 2 cannot grip the cam between the inner surface of the outer ring 4 and the shaft 3, and the outer ring 4 is therefore not driven by the shaft 3.

The overrunning clutch according to the invention may be utilized in a simple and trouble free manner. The device may, in particular, be used whenever it is desired to provide easy mounting of the cage and cams.

What is claimed is:

1. Overrunning clutch of the type comprising a plurality of cams positioned between the two facing concentric surfaces of a shaft and concentric external ring, said clutch comprising an annular cage having openings through which said cams project, one end of each cam being smaller in section than the other in a plane parallel to the opening through which it projects, and said openings being large enough to pass the smaller end of a cam but too small to pass the larger end, and spring means engaging the smaller end of each cam and biassing it away from said cage toward one of said concentric surfaces.

2. Overrunning clutch as claimed in claim 1 in which each cam has two substantially cylindrical surfaces, each positioned to contact one of said concentric surfaces, and said spring means are coil springs encircling radial projections extending inwardly from said cage.

3. Clutch as claimed in claim 1 in which the openings in the cage are flanked by inwardly projecting flanges perpendicular to the axis of the cage.

4. Clutch as claimed in claim 1 in which said cage is formed with two outwardly projecting circumferentially spaced bosses for engaging the inner surface of said ring.

5. Clutch as claimed in claim 4 in which one of said bosses is split across its full width, transversely to the axis of the cage.

6. Clutch as claimed in claim 2 in which said radial projections are integral with said cage and the smaller ends of said cams are provided with transversely projecting abutments against which said springs bear.

7. Clutch as claimed in claim 6 in which said openings are substantially rectangular.

* * * * *